(No Model.)

F. NISHWITZ.
HARROW.

No. 260,311. Patented June 27, 1882.

WITNESSES

INVENTOR
Frederick Nishwitz.
By his Attorneys

UNITED STATES PATENT OFFICE.

FREDERICK NISHWITZ, OF MILLINGTON, NEW JERSEY.

HARROW.

SPECIFICATION forming part of Letters Patent No. 260,311, dated June 27, 1882.

Application filed January 23, 1882. (No model.)

*To all whom it may concern:*

Be it known that I, FREDERICK NISHWITZ, of Millington, in the county of Morris and State of New Jersey, have invented certain new and useful Improvements in Harrows, of which the following is a specification.

In my Patent No. 225,634, granted March 16, 1880, I have shown a harrow of the general character of that herein shown. In the patented machine, however, the driver's seat is carried and supported wholly on the tongue. An objection to this organization is that in operating the lever the driver necessarily lifts his entire weight. This renders the machine difficult of manipulation and unnecessarily cumbersome in work. The present invention constitutes an improvement upon the former machine, which improvement consists primarily in supporting the seat upon the harrow gang-bar, and, secondly, in hinging or pivoting the seat-standard upon the tongue and supporting it by a pivoted rod or link upon the gang-bar, so that in operating the lever the weight of the driver and of the forward part of the machine rocks upon a center of motion instead of being lifted, as in the former case.

The subject-matter claimed will hereinafter be specifically set forth.

Figure 1:
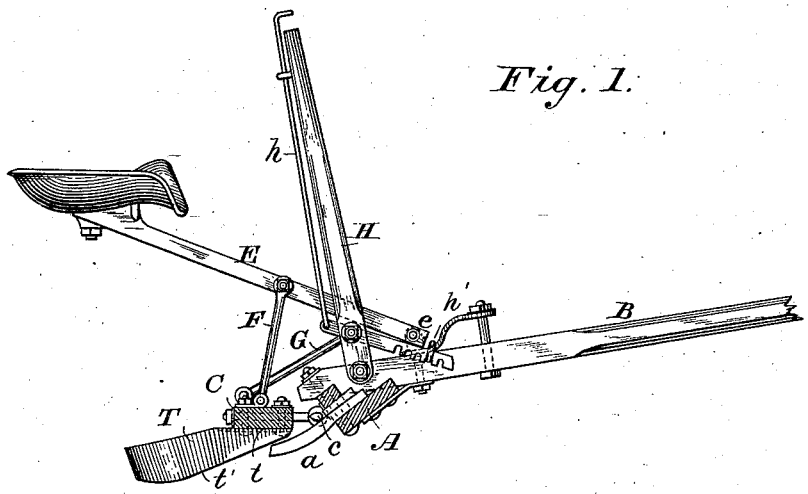
Figure 2:
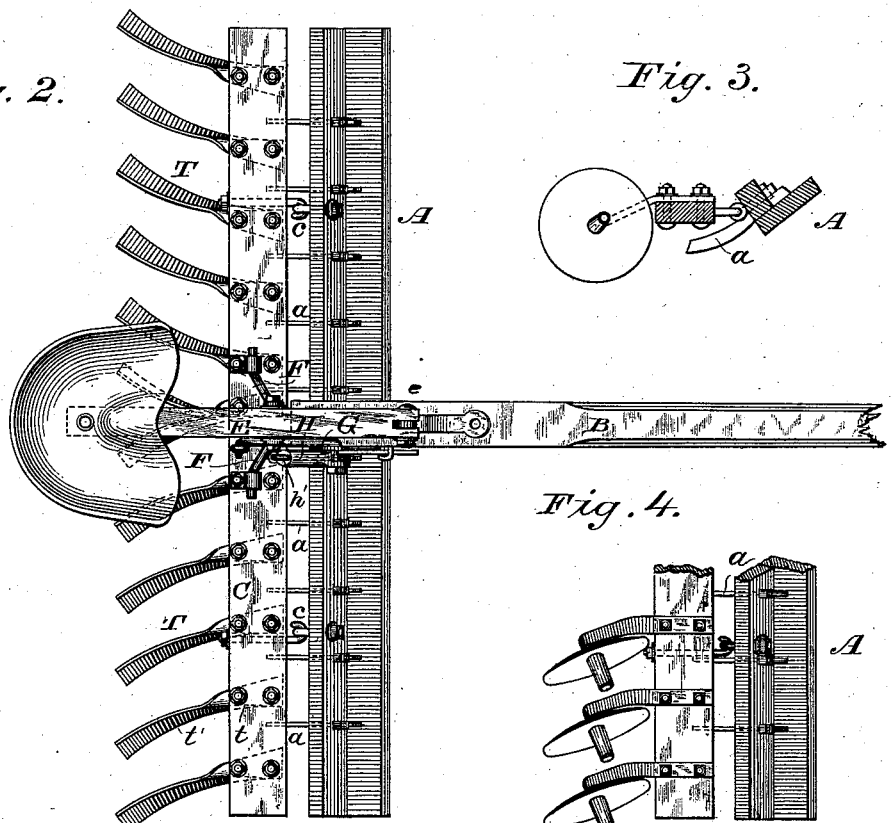
Figure 3:
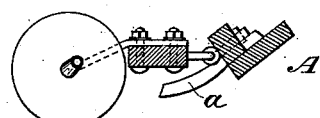

In the accompanying drawings, Figure 1 is a transverse section; Fig. 2, a plan view; Fig. 3, a detail sectional view, showing a disk-cutter on the gang-bar in place of the trailing harrow-tooth; and Fig. 4, a detail plan view, also showing disk-cutters on the gang-bar.

The clod-crusher or leveler-bar A is shown as rigidly secured to the draft-pole or tongue B by means of straps and bolts. The bar is shown as L-shaped or right-angular in cross-section, the two portions or beams of which it is composed being securely held together by angle-irons, as is well understood. Its forward leveling or clod-crushing face is inclined upwardly, as is clearly shown in Fig. 1 of the drawings.

Harrowing devices a, which are in this instance straight spurs or cutters with a curved cutting-edge, are secured in the leveler-bar, as shown, by locking keys or wedges, or in any other suitable manner, and project rearwardly about in line with the inclined crushing-face of the bar. The gang-bar C is hinged to the leveler, as shown in the drawings, at c c, so as to permit it to rock up and down and allow a vertical flexure of both bars. This gang-bar is shown as provided with two series of harrow-teeth, T. A series is arranged on each side of the line of draft and the teeth in each series curved in opposite directions, as shown, so that the pressure of the teeth upon the soil will be equal on both sides of the line of draft and insure the rectilinear motion of the machine.

The teeth on the gang-bar are by preference arranged opposite the spaces between the teeth or spurs on the leveler. The special forms of teeth and their arrangement shown in the drawings are good; but of course the teeth and their relative arrangement may be varied. Nor is it necessary that there should be any teeth or cutters on the leveler or clod-crusher, though I prefer to employ them.

The driver's seat is mounted upon the standard E, which is hinged at e on the tongue, so as to rise and fall or rock vertically. A pivoted supporting bar or link, F, extends from the seat-standard to the gang-bar. Thus the seat is pivoted directly upon the tongue, but is supported upon the gang-bar, and the tongue or draft-frame and crusher, gang-bar, and seat-standard are all hinged or pivotally connected, so that their positions relatively to each other may be varied by a vertical rocking or flexure of the parts. Thus the seat-standard and its supporting-links constitute a pivoted coupling between the gang-bar and frame, in addition to and independently of their function as a seat-support.

In order to vary the relation of the gang-bar and its cutters and of the leveler to the ground and hold them in their adjusted relation, I connect the gang-bar by a pivoted link, G, with a lever, H, pivoted on the frame. This lever is held in any desired position by means of a notched locking bar or dog, which is operated by a thumb-rod, h, and the notches in which engage in a loop or eye, h', on the tongue. By this construction the driver may, from his seat on the machine, operate the lever so as to elevate the leveler and depress the cutters on the gang-bar, or vice versa. Thus by drawing the lever toward him the driver may elevate the crusher and throw the teeth down, so that they will cut deeper into the soil, and by releasing the lever and allowing it to move from him the crusher-bar will descend, while the angular relation of the cultivating devices on the gang-bar will be varied relatively to the ground. In accomplishing this adjustment of the machine the edges of the cultivator-teeth constitute a fulcrum upon which the machine rocks.

As will be understood by those familiar with this class of machines, and as is fully set forth in my previous patent hereinbefore referred to, the leveler or clod-crusher will smooth the surface, crushing down clods and minor irregularities in the surface of the field, while the cutting devices or teeth on the bar will break up hard lumps and scarify and cut up the soil, leaving it in the most advantageous condition to be thoroughly operated upon by the gang of harrow-teeth proper.

Figure 4:
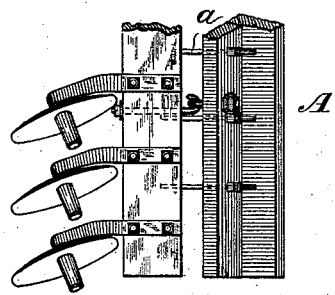

In Figs. 3 and 4 of the drawings I have shown concavo-convex cutting-disks arranged upon the gang-bar in place of the harrow-teeth above described. Disks may be used in this organization with advantage; but no claim is made herein to such subject-matter. Each disk is mounted on a short stud-axle carried by a rearwardly-projecting bar bolted on the gang-bar. The disks are, as shown in the drawings, preferably arranged at an angle both to the line of draft and to the horizon, as is well understood by those familiar with this class of machines.

When the machine is to be transported from place to place the adjusting-lever is released and the leveler allowed to rest upon the ground, so that the machine will be primarily supported by it and not by the harrow-teeth.

The seat-standard is shown as pivoted upon the tongue and supported upon the gang-bar by a link or rod. The machine may, however, without departing from the principal feature of my invention, be modified by supporting the seat-standard directly upon the gang-bar and connecting it with the tongue or frame by a link; or it may be supported entirely upon the gang-bar and not be connected in any way with the tongue or frame, the seat being so arranged as to properly balance the machine. This will be obvious to those skilled in the art.

I claim as my invention—

1. The combination, substantially as set forth, of the tongue or frame, the upwardly-inclined leveler or crusher-bar rigidly secured thereto, the transverse gang-bar in rear of the leveler and hinged thereto, harrow-teeth on the gang-bar, and the driver's seat supported directly on the gang-bar.

2. The combination, substantially as set forth, of the tongue or frame, the leveler or crusher rigidly secured thereto, the gang-bar or harrow-frame carrying harrowing devices in rear of the leveler, and hinged thereto, and a driver's seat pivoted on the tongue or frame and supported upon the gang-bar.

3. The combination, substantially as set forth, of the tongue or frame, the leveler or crusher rigidly secured thereto, the gang-bar or harrow-frame carrying harrowing devices in rear of the leveler, a driver's seat pivoted on the tongue or frame and supported on the gang-bar, mechanism for adjusting the gang-bar and leveler relatively to each other, and a detent for holding them in their adjusted position.

4. The combination, substantially as set forth, of the tongue or frame, the leveler or clod-crusher rigidly secured thereto, the gang-bar carrying harrowing devices and hinged to the rear of the leveler, the seat-standard pivoted on the frame or tongue and supported on the gang-bar, a lever on the frame or tongue, a link-connection between the lever and gang-bar, and a detent for holding the lever in any desired position, whereby the relation of the gang-bar and leveler to each other and to the ground may be varied.

5. The combination, substantially as set forth, of the frame or tongue, the leveler or crusher rigidly secured thereto, the gang-bar hinged in rear of the crusher, and a pivoted coupling, which also serves as a seat-support between the gang-bar and frame, and which permits the frame and crusher, gang-bar, and coupling to flex vertically to vary their relation to each other.

In testimony whereof I have hereunto subscribed my name this 18th day of January, 1882.

FREDERICK NISHWITZ.

Witnesses:
JAMES R. RUNYON,
JAMES A. BAKER.